United States Patent
Sivakumar et al.

(10) Patent No.: US 7,583,590 B2
(45) Date of Patent: Sep. 1, 2009

(54) ROUTER AND METHOD FOR PROTOCOL PROCESS MIGRATION

(75) Inventors: Kaarthik Sivakumar, Santa Rosa, CA (US); Suresh Bhogavilli, Gaithersburg, MD (US); Samir Shah, Rockville, MD (US); Christopher Sherwin, Rockville, MD (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 624 days.

(21) Appl. No.: 11/182,967

(22) Filed: Jul. 15, 2005

(65) Prior Publication Data

US 2007/0014231 A1    Jan. 18, 2007

(51) Int. Cl.
*H04J 1/16* (2006.01)
*H04J 3/14* (2006.01)
(52) U.S. Cl. .................................. 370/217; 370/221
(58) Field of Classification Search ................ 370/216, 370/217, 218, 219, 220, 221, 225, 227, 228, 370/238, 239
See application file for complete search history.

(56) References Cited

U.S. PATENT DOCUMENTS

| | | | | |
|---|---|---|---|---|
| 5,408,462 A * | 4/1995 | Opoczynski | ................ | 370/220 |
| 5,461,609 A * | 10/1995 | Pepper | ........................ | 370/218 |
| 5,491,787 A * | 2/1996 | Hashemi | ....................... | 714/11 |
| 5,544,077 A * | 8/1996 | Hershey | ........................ | 702/58 |
| 6,378,021 B1 * | 4/2002 | Okazawa et al. | ............ | 710/317 |
| 6,483,833 B1 * | 11/2002 | Jagannath et al. | ........... | 370/392 |
| 6,751,188 B1 * | 6/2004 | Medved et al. | ............... | 370/216 |
| 6,906,998 B1 * | 6/2005 | Mujeeb et al. | ............... | 370/218 |
| 6,947,669 B2 * | 9/2005 | Wu et al. | ....................... | 398/57 |
| 7,155,632 B2 * | 12/2006 | Vasavada | ........................ | 714/4 |
| 7,304,940 B2 * | 12/2007 | Larsen et al. | ................ | 370/218 |
| 7,359,377 B1 * | 4/2008 | Kompella et al. | ............ | 370/389 |
| 2003/0046604 A1 * | 3/2003 | Lau et al. | ........................ | 714/11 |
| 2003/0056138 A1 * | 3/2003 | Ren | ............................... | 714/4 |
| 2004/0136368 A1 * | 7/2004 | Wakayama et al. | .......... | 370/389 |
| 2004/0264384 A1 * | 12/2004 | Deval et al. | .................. | 370/252 |
| 2005/0135233 A1 | 6/2005 | May | | |
| 2005/0270971 A1 * | 12/2005 | Capelle et al. | ............... | 370/216 |
| 2006/0062142 A1 * | 3/2006 | Appanna et al. | ............ | 370/219 |

* cited by examiner

*Primary Examiner*—Chi H Pham
*Assistant Examiner*—Warner Wong (57) ABSTRACT

A router and a method for migrating routing protocol processes or Virtual Routers (VRs) from one Route Processor (RP) to another using graceful restart procedures for maintaining packet flow to the router and assisting the router to obtain restart information. The router includes first and second RPs and a forwarding engine for forwarding packets to neighbor routers in the network. When the routing protocol process is terminated on the first RP, the neighbor routers detect a router failure and initiate the graceful restart procedures. A filter rule in the forwarding engine causes it to forward packets to the new routing protocol process on the second RP. The new process learns the network topology from the neighbor routers, and the migration is completed without packet loss and without requiring complex changes to the network protocol stack.

21 Claims, 5 Drawing Sheets

ROUTER AND METHOD FOR PROTOCOL PROCESS MIGRATION

BACKGROUND

The present invention relates to communication systems. More particularly, and not by way of limitation, the present invention is directed to a router and a method in an Internet Protocol (IP)-based network for migrating protocol processes from one route processor to another route processor using a graceful restart procedure.

In state-of-the-art IP routers, different processors are implemented to handle control functions and packet-forwarding functions. When routing and signaling protocols running on the control processor fail, forwarding of payload traffic is interrupted even though all the information required to perform such forwarding is available to the packet-forwarding processor. This interruption occurs because neighbor routers detect the failure of the routing and signaling protocols and assume that the entire router has failed. Consequently, the neighbor routers compute alternate paths bypassing the "failed" router. During this time, called routing convergence time, there is a potential for traffic loss.

To address this problem, the Internet Engineering Task Force (IETF) has standardized a set of extensions to the routing and signaling protocols to gracefully handle the restart of a failed protocol process on a neighbor router. When these extensions are implemented and a router's control software must be restarted, the router's neighbors continue to use it for forwarding traffic. Neighbors also help the restarted router software relearn the state that was known prior to the failure.

It is also known for IP network operators to build, manage, and provision virtual private networks (VPNs) on top of their existing infrastructure. These networks are typically used by enterprises that need interconnectivity between geographically distributed sites. Using a private network is also appealing because it offers a level of protection from intruders. Telecom network operators also use VPNs to provide traffic separation between various classes of telecom traffic. This is useful for providing different quality of service (QoS) and security services to these traffic classes.

With the growth in the size and speed of IP networks, routers or packet processing nodes must be scalable. Otherwise as the demands for processing power increase, or as more customer VPNs are configured, more and more routers must be deployed with added operational complexity and expenditure. To handle the resiliency and scalability needs of IP and telecom networks, routers or packet processing nodes are increasingly designed using a cluster of processors. To address scalability needs, middleware known as cluster management software distributes the processing load across multiple processors. The increase in processing demands is addressed by adding more processors to the cluster and migrating processes to the new processors. Any state needed by the process is also migrated to its new location by the cluster management software. Although effective, the use of processor clusters increases the complexity and cost of implementation of the routers.

An alternative that offers resiliency against node failures is to maintain one or more control processors (usually known as Route Processors or RPs) in hot-standby state to backup a primary RP. The protocol state is replicated between the primary and backup RPs. If the primary RP fails, the backup RP takes over and masks the failure from the router's neighbors. The complexity in this approach is in synchronizing state information between the primary and backup RPs. For protocols like Border Gateway Protocol (BGP) and Label Distribution Protocol (LDP) that run over the Transmission Control Protocol (TCP), TCP session state (such as sequence numbers, congestion window parameters, and the like) must also be replicated.

Thus, what is needed in the art is a more efficient way to handle the resiliency and scalability needs of IP and telecom networks that overcomes the deficiencies of conventional systems and methods. The present invention provides such a router and method.

SUMMARY

The present invention provides a router and a method of migrating routing protocol processes from one Route Processor (RP) to another using graceful restart procedures. The RPs may be in the same router or different routers. A similar mechanism is utilized to migrate a Virtual Router (VR) and all its associated processes from one RP to another.

Thus, in one aspect, the present invention is directed to a method in a router in an Internet Protocol (IP)-based network for migrating routing protocol processes from a first route processor to a second route processor. The router includes a forwarding engine for forwarding packets to neighbor routers in the network, and the neighbor routers include a graceful restart procedure for maintaining packet flow to the router and assisting the router if the router fails. The method includes terminating the routing protocol processes on the first route processor, thereby indicating to the neighbor routers that the router has failed, and causing the neighbor routers to start the graceful restart procedure; and restarting the routing protocol processes on the second route processor. The method also includes diverting by the forwarding engine, packets destined for the routing protocol processes on the first route processor to the restarted routing protocol processes on the second route processor; and receiving by the restarted routing protocol processes on the second route processor, information from the neighbor routers regarding the network's topology. In this aspect, the routing protocol processes may be, for example, Border Gateway Protocol (BGP) processes.

In another aspect, the method may include terminating the routing protocol processes on the first route processor; and adding a filter rule to the forwarding engine after terminating the routing protocol processes on the first route processor. The filter rule causes the forwarding engine to divert packets destined for the routing protocol processes on the first route processor to the restarted routing protocol processes on the second route processor. The method also includes restarting the routing protocol processes on the second route processor; sending a message to each of the neighbor routers requesting the neighbor routers to start the graceful restart procedure; and receiving by the restarted routing protocol processes on the second route processor, information from the neighbor routers regarding the network's topology. In this aspect, the routing protocol processes may be, for example, Open Shortest Path First (OSPF) processes or Intermediate System to Intermediate System Protocol (IS-IS) processes.

In yet another aspect, when the routing protocol processes do not have a defined graceful restart procedure, said method may include terminating the routing protocol processes on the first route processor; adding the filter rule to the forwarding engine; restarting the routing protocol processes on the second route processor; and receiving periodic refresh messages from each of the neighbor routers regarding a protocol state. The refresh messages include information on all routes within the network's routing domain. The router then sends a message to each of the neighbor routers advertising that the router is operational. In this aspect, the routing protocol processes may be, for example, Routing Information Protocol (RIP).

In yet another aspect, the present invention is directed to a method in a router in an IP-based network for migrating a Virtual Router (VR) from a first route processor to a second route processor. The router includes a forwarding engine for forwarding packets to neighbor routers in the network; the VR includes routing and signaling protocol processes and a Route Table Manager (RTM) that computes a forwarding information base utilized by the forwarding engine; and the neighbor routers include a graceful restart procedure for maintaining packet flow to the router and assisting the router if the router fails. The method includes terminating the VR's routing and signaling protocol processes on the first route processor, thereby indicating to the neighbor routers that the router has failed, and causing the neighbor routers to start the graceful restart procedure; restarting the VR's routing and signaling protocol processes on the second route processor; and diverting by the forwarding engine, packets destined for the VR's routing and signaling protocol processes on the first route processor to the VR's restarted routing and signaling protocol processes on the second route processor. The method also includes receiving by the VR's restarted routing and signaling protocol processes on the second route processor, information from the neighbor routers regarding the network's topology; restarting the VR's RTM on the second route processor; and receiving by the VR's restarted RTM, information from the VR's restarted routing and signaling protocol processes regarding the network's topology, thereby establishing a routing state. The method also includes receiving by the VR's restarted RTM, information from the forwarding engine regarding the current forwarding information base, thereby establishing a forwarding information state; and synchronizing by the RTM, the forwarding information state and the routing state.

In yet another aspect, the present invention is directed to a router in an IP-based network in which neighbor routers include a graceful restart procedure for maintaining packet flow to the router and assisting the router if the router fails. The router includes a forwarding engine for forwarding packets to the neighbor routers in the network; a first route processor connected to the forwarding engine for running routing protocol processes; a second route processor connected to the forwarding engine for running routing protocol processes; and means for migrating a routing protocol process from the first route processor to the second route processor, said migrating means including means for preventing packet loss while migrating the routing protocol process, without requiring changes to the network protocol stack.

BRIEF DESCRIPTION OF THE SEVERAL VIEWS OF THE DRAWINGS

In the following section, the invention will be described with reference to exemplary embodiments illustrated in the figures, in which.

DETAILED DESCRIPTION

The present invention provides a router and a method for migrating routing protocol processes from one Route Processor (RP) to another using graceful restart procedures. The RPs may be in the same router or different routers. A similar mechanism is utilized to migrate a Virtual Router (VR) and all its associated processes from one RP to another. Routing protocols, such as the Border Gateway Protocol (BGP), Open Shortest Path First (OSPF), Intermediate System to Intermediate System Protocol (IS-IS), and Routing Information Protocol (RIP), communicate with a Route Table Manager (RTM) using an Application Programming Interface (API) that hides the communication between these processes. In such a communication method, it is unknown to each process exactly where the other end of the communication channel is located. This provides flexibility by allowing routing protocols to reside on a first RP while the RTM resides on a different RP or, conversely, the routing protocols and RTM may all reside on the same RP.

Figure 1:
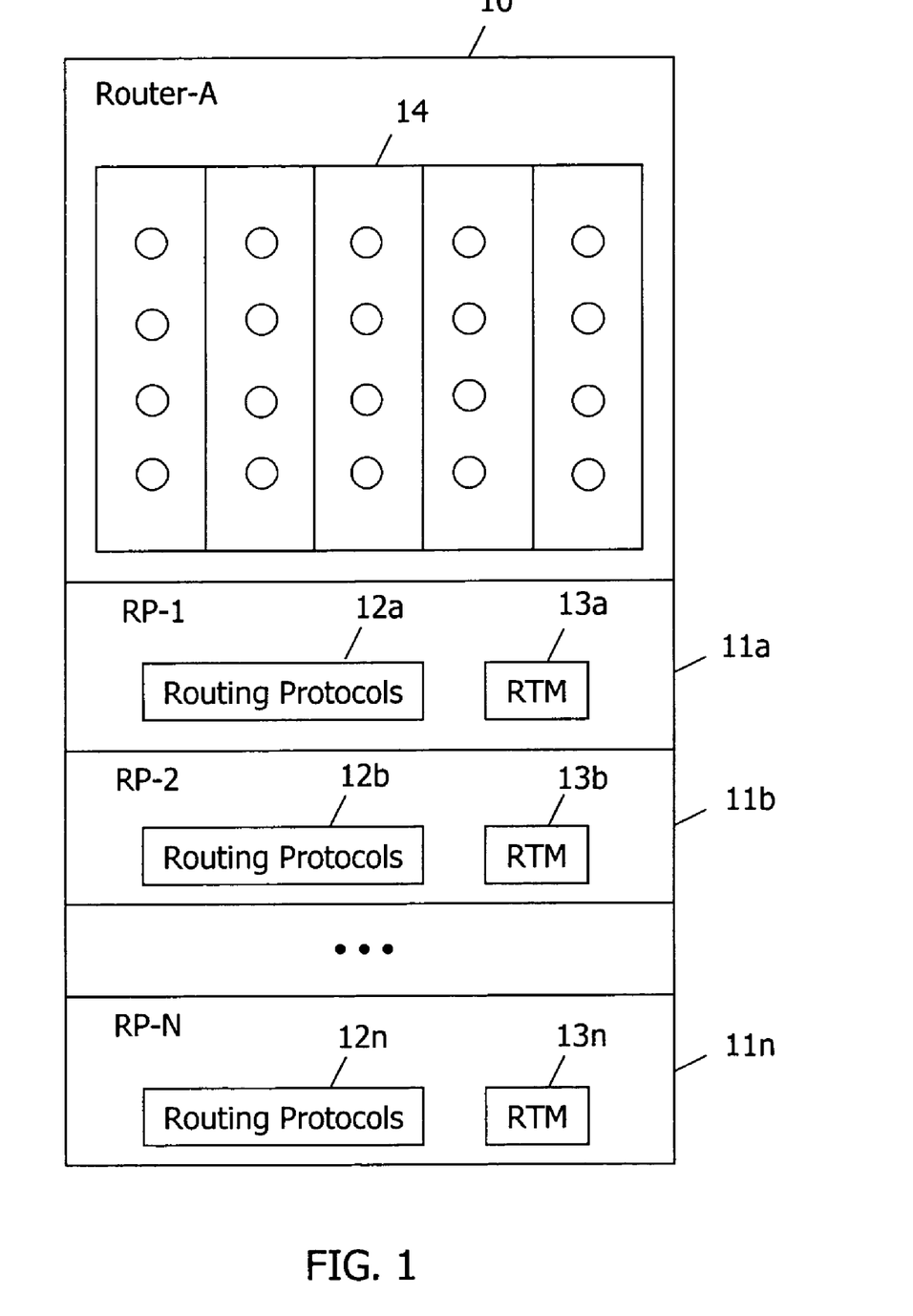
FIG. 1 is a simplified block diagram of a router in an embodiment of the present invention.

FIG. 1 is a simplified block diagram of a router (Router-A) 10 in an embodiment of the present invention. Router-A includes one or more Route Processor (RP) boards 11a-11n that house the control plane of the router. The RPs may include routing protocols 12a-12n and RTMs 13a-13n. A plurality of forwarding engines 14 in the router perform the packet-forwarding functions of the router. The control plane uses interfaces on the forwarding engines to communicate with specific router neighbors and to set up the forwarding engines to provide packet forwarding.

In the embodiment described herein, the routing protocols 12 and RTM processes 13 run on one or more of the RP boards 11. If only one RP board is present, all the processes run on the single RP. If two or more RPs are present, the routing protocols and RTM may run on separate available RPs. Interprocess Communications (IPCs) between the routing protocols and the RTMs ensure that all the processes can talk to each other irrespective of the RP board on which they are running. Similarly one or more VRs may be instantiated on multiple RP boards depending on the processing requirements of the VR's processes.

BGP Graceful Restart for Process Migration

BGP is a path-vector-based routing protocol that is primarily used to set up routing connections across routing domains. It is a very popular and important protocol used in routers. BGP works by setting up a TCP socket connection between two neighbor routers. The entire BGP connection is dependent on the continued existence of the TCP connection. Failure of the TCP connection in any way results in the loss of the BGP session and a further loss of forwarding capabilities, which leads to severe damage of the network functionality.

The Graceful Restart procedure for BGP requires that a loss of the TCP connection be a signal to the receiving router that the neighbor router has failed. The procedure requires the receiving router to continue to use the failed router for forwarding until told otherwise by the restarting router. This procedure ensures that if only the BGP process on a router dies, then traffic will continue to be forwarded while the BGP process restarts itself, thus ensuring that the network traffic is not lost.

Migration of BGP processes requires that the TCP connection continue to be maintained during the time that the process moves from one RP to another. This is a very complex problem that is still being researched and there are very few successful implementations of this technique. Existing techniques require that the entire TCP/IP network stack of the router be revamped to deal with a TCP connection migration.

Figure 2:
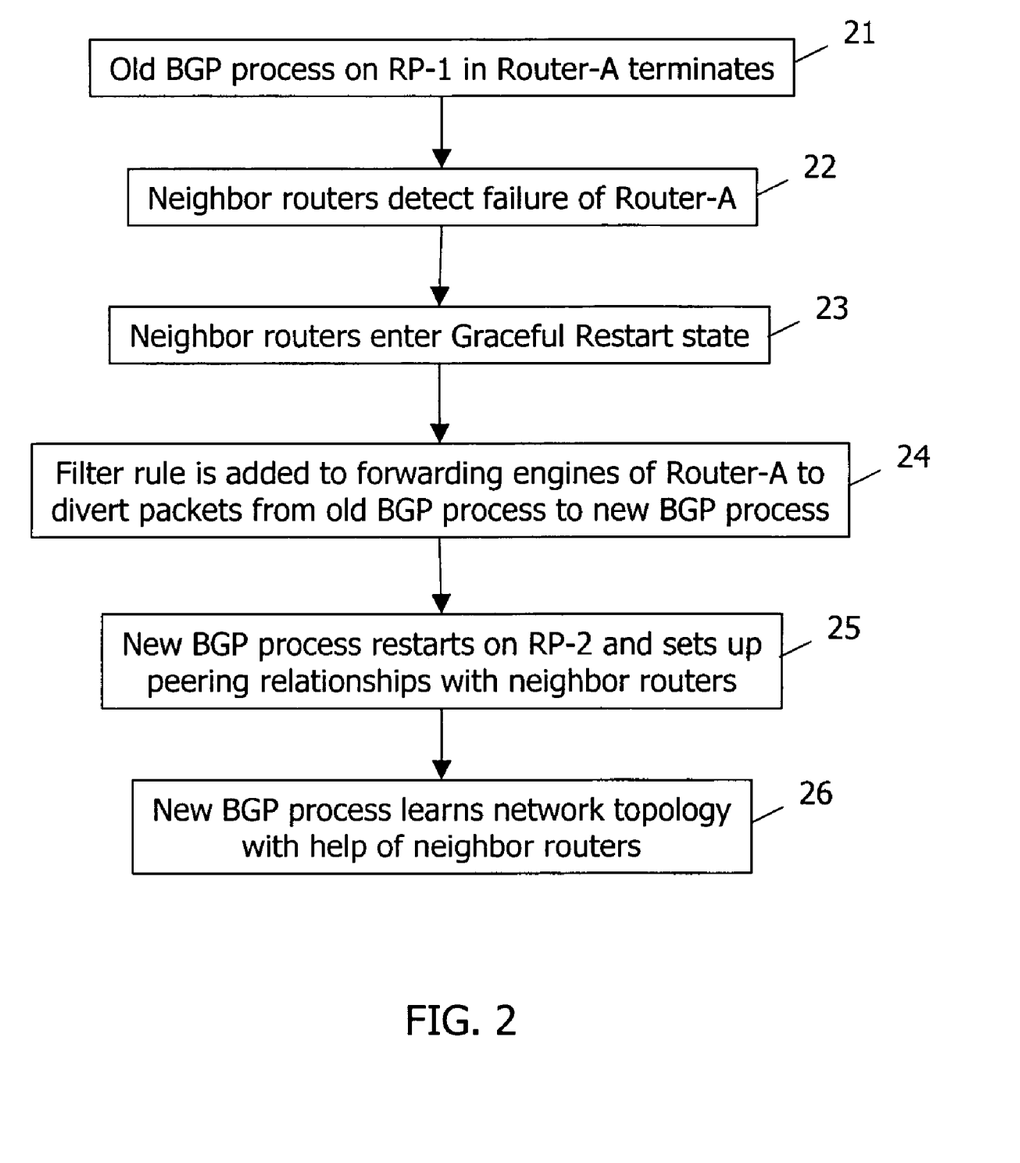
FIG. 2 is a flow chart illustrating the steps of an embodiment of the method of the present invention when migrating a BGP process from a first Route Processor to another.

FIG. 2 is a flow chart illustrating the steps of an embodiment of the method of the present invention when migrating a BGP process from a first Route Processor (RP-1) 11*a* in Router-A 10 to a second Route Processor (RP-2) 11*b*. In the present invention, no TCP connection migration is necessary. Instead, when the BGP process is ready to migrate to RP-2, it terminates itself at step 21. At step 22, Router-A's neighbor routers detect the failure of Router-A. This causes the neighbor routers to enter the Graceful Restart state at step 23. At step 24, a filter rule is added to the forwarding engines 14 to detect TCP packets destined for the terminated BGP process, and to divert the packets to a new BGP process on RP-2. At step 25, the BGP process then restarts on RP-2 and sets up peering relationships with its neighbor routers. At step 26, the new BGP process learns the network topology with the help of the neighbor routers.

Thus, the invention's use of Graceful Restart for BGP process migration completely removes the need to do any complex manipulation of the TCP/IP network stack. The invention may additionally be utilized on any stock, off-the-shelf, network stack. The invention therefore drastically reduces the complexity of implementing process migration for BGP processes. This reduces developer costs for the vendor and purchasing costs for the customer.

Migration of Protocols Other than BGP

Protocols such as OSPF, IS-IS, and RIP do not run over TCP and hence there is no session state maintained inside the operating system running over the RP. However, the protocol processes do maintain protocol state, and this state needs to be relearned once the protocol process is restarted on the new RP. The OSPF and IS-IS protocols have graceful restart mechanisms defined, but RIP does not.

Figure 3:
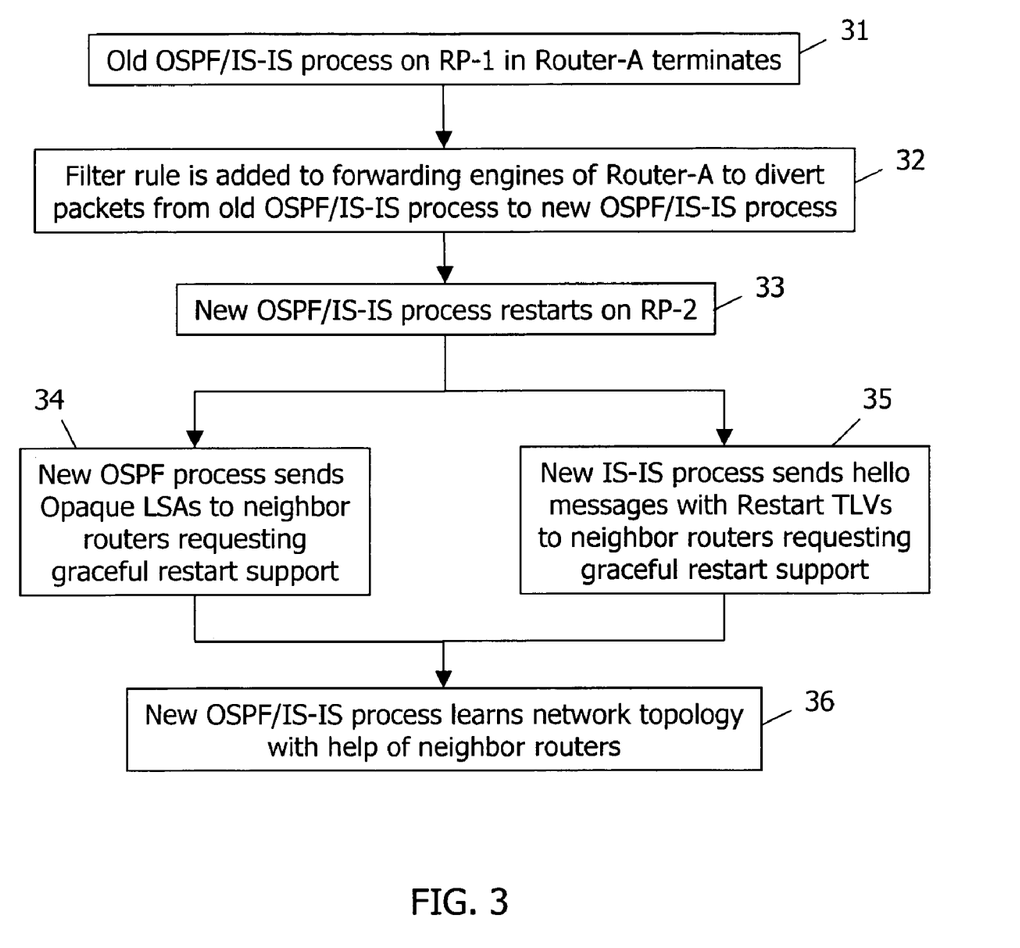
FIG. 3 is a flow chart illustrating the steps of an embodiment of the method of the present invention when migrating an OSPF or IS-IS process from a first Route Processor to another.

FIG. 3 is a flow chart illustrating the steps of an embodiment of the method of the present invention when migrating an OSPF or IS-IS process from a first RP-1 to a second RP-2. When the protocol process is ready to migrate to RP-2, it is terminated on RP-1 at step 31. At step 32, a filter rule is added to the forwarding engines to detect the protocol packets destined for the old OSPF/IS-IS process and to divert the packets to the new OSPF/IS-IS process on RP-2. At step 33, the protocol process is then restarted on RP-2. If the process is an OSPF process, the method moves to step 34 where the restarted OSPF process sends out Opaque Link State Advertisements (LSAs) requesting graceful restart support from neighbor routers. If the process is an IS-IS process, the method moves instead to step 35 where the restarted IS-IS process sends a Restart Type, Length and Value (TLV) field in its hello messages, with the Restart Request (RR) flag set, thus indicating to its neighbors that it is restarting. At step 36, the new OSPF/IS-IS process learns the network topology with the help of the neighbor routers. Thus, all routing adjacencies are brought up using Graceful Restart mechanisms without affecting traffic forwarding.

Figure 4:
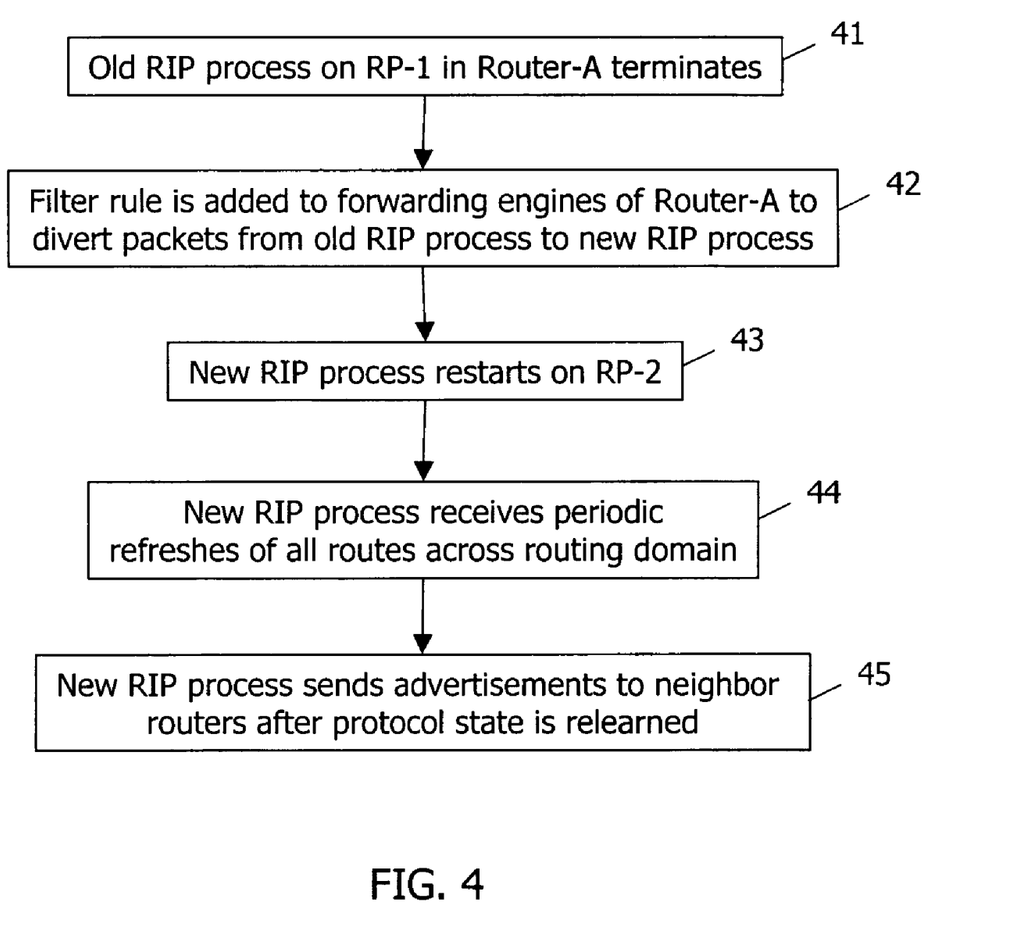
FIG. 4 is a flow chart illustrating the steps of an embodiment of the method of the present invention when migrating an RIP process from a first Route Processor to another.

FIG. 4 is a flow chart illustrating the steps of an embodiment of the method of the present invention when migrating a RIP process from a first RP-1 to a second RP-2. The RIP protocol does not have any graceful restart mechanisms defined. However RIP is another distance-vector protocol, and it uses periodic refreshes of all the routes across the routing domain. A restarting RIP process on a new RP simply waits long enough to relearn its protocol state prior to sending out its own advertisements. That achieves process migration without affecting packet forwarding.

Thus, when the protocol process is ready to migrate to RP-2, it is terminated on RP-1 at step 41. At step 42, a filter rule is added to the forwarding engines to detect the protocol packets destined for the old RIP process and to divert the packets to the new RIP process on RP-2. At step 43, the RIP process is then restarted on RP-2. At step 44, the new RIP process receives periodic refreshes of all the routes across the routing domain. At step 45, the new RIP process sends advertisements to neighbor routers after the RIP process has relearned its protocol state.

Migration of VRs

Figure 5:
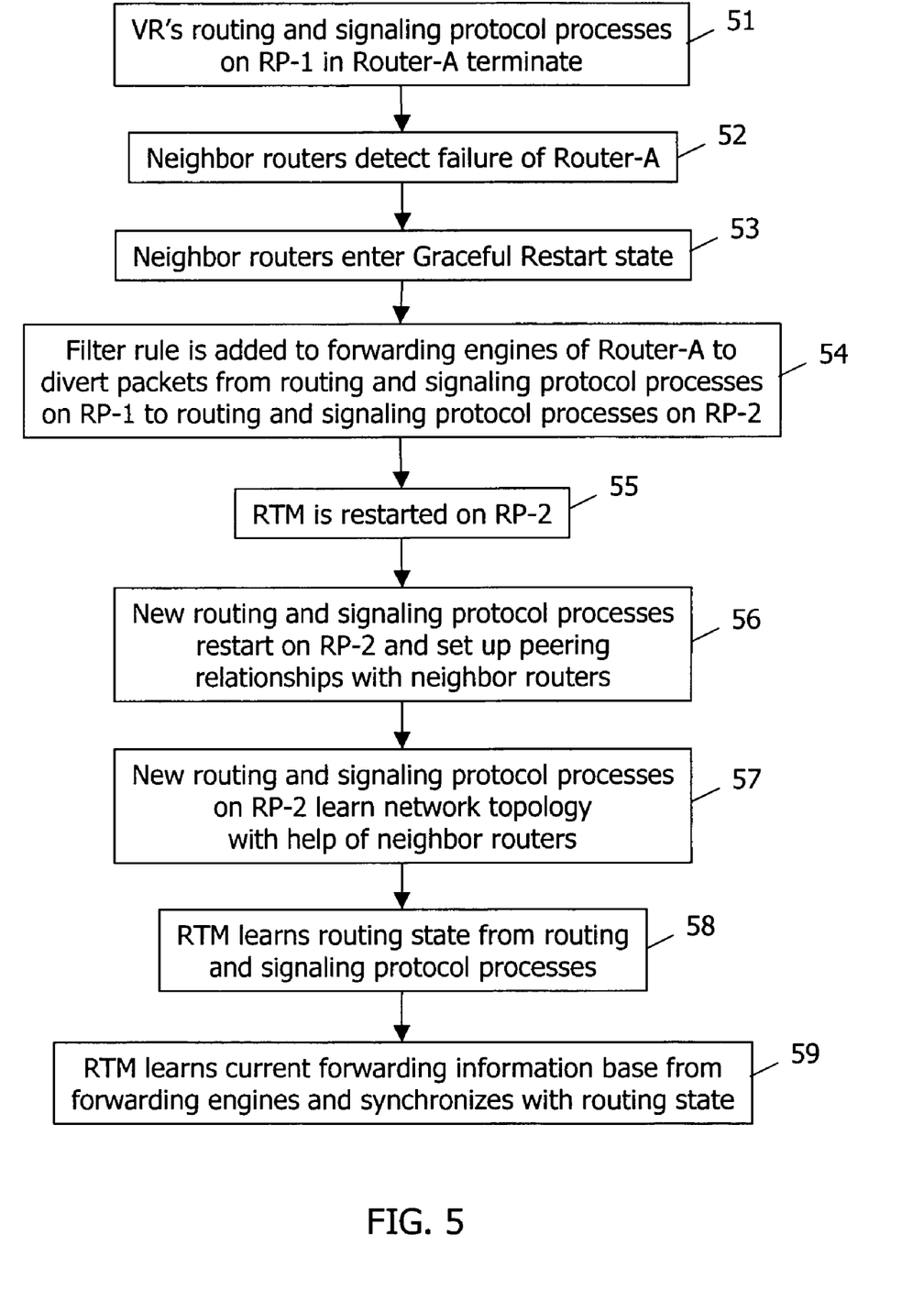
FIG. 5 is a flow chart illustrating the steps of an embodiment of the method of the present invention when migrating a Virtual Router (VR) from a first Route Processor to another.

FIG. 5 is a flow chart illustrating the steps of an embodiment of the method of the present invention when migrating a Virtual Router (VR) from a first RP-1 to a second RP-2. A VR typically consists of routing and signaling protocol processes and an RTM that computes the forwarding information base utilized by the forwarding engine. To migrate the VR, all these processes must be migrated to the new RP. The routing and signaling protocols of the VR are terminated and restarted on the new RP as described above. Migrating the RTM involves restarting it on the new RP and allowing it to relearn the routing state from the routing protocols. It learns the current forwarding information base from the forwarding engines, and synchronizes the two states.

Thus, when the VR is ready to migrate to RP-2, its routing and signaling protocol processes are terminated on RP-1 at step 51. At step 52, assuming the routing and signaling protocol processes have graceful restart mechanisms defined, Router-A's neighbor routers detect the failure of Router-A and enter the Graceful Restart state at step 53. At step 54, a filter rule is added to the forwarding engines 14 to detect TCP packets destined for the VR's terminated routing and signaling protocol processes, and to divert the packets to new routing and signaling protocol processes on RP-2. At step 55, the RTM is restarted on RP-2. At step 56, the routing and signaling protocol processes restart on RP-2 and set up peering relationships with neighbor routers. At step 57, the new routing and signaling protocol processes learn the network topology with the help of the neighbor routers. At step 58, the RTM learns the routing state from the routing and signaling protocol processes, and at step 59, the RTM learns the current forwarding information base from the forwarding engines and synchronizes the forwarding information state with the routing state.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method in a first router in an Internet Protocol (IP)-based network for migrating routing protocol processes from a properly functioning first route processor to a second route processor, wherein the first router includes a forwarding engine for forwarding packets to neighbor routers in the network, and the neighbor routers include a graceful restart procedure for maintaining packet flow to the first router and assisting the first router if the first router fails, said method comprising:

terminating the routing protocol processes on the properly functioning first route processor, thereby stopping the first route processor from responding to messages from the neighbor routers and thereby providing a false indication to the neighbor routers that the first router has failed, wherein, in response to detecting the false failure, the neighbor routers start the graceful restart procedure;

restarting the routing protocol processes on the second route processor;

diverting by the forwarding engine, packets destined for the routing protocol processes on the first route processor to the restarted routing protocol processes on the second route processor; and receiving by the restarted routing protocol processes on the second route processor, information from the neighbor routers regarding the network's topology as part of the graceful restart procedure.

2. The method of claim 1, wherein the first route processor and the second route processor are both in the first router.

3. The method of claim 1, wherein the first route processor and the second route processor are in different routers.

4. The method of claim 1, wherein the method is preceded by the step of determining that a processing load, shared between multiple route processors, needs to be redistributed to increase router scalability.

5. The method of claim 1, wherein the step of diverting packets by the forwarding engine includes adding a filter rule to the forwarding engine after terminating the routing protocol processes on the first route processor, the filter rule causing the forwarding engine to divert packets destined for the routing protocol processes on the first route processor to the restarted routing protocol processes on the second route processor.

6. The method of claim 1, wherein the step of restarting the routing protocol processes on the second route processor includes setting up peering relationships with the neighbor routers.

7. The method of claim 1, wherein the routing protocol processes are Border Gateway Protocol (BGP) processes.

8. A method in a first router in an Internet Protocol (IP)-based network for migrating routing protocol processes from a properly functioning first route processor to a second route processor, wherein the first router includes a forwarding engine for forwarding packets to neighbor routers in the network, and the neighbor routers include a graceful restart procedure for maintaining packet flow to the first router and assisting the first router if the first router fails, said method comprising:

terminating the routing protocol processes on the properly functioning first route processor thereby creating a false failure condition;

adding a filter rule to the forwarding engine after terminating the routing protocol processes on the first route processor, the filter rule causing the forwarding engine to divert packets destined for the routing protocol processes on the first route processor to the restarted routing protocol processes on the second route processor in response to the false failure condition;

restarting the routing protocol processes on the second route processor;

sending a message to each of the neighbor routers requesting the neighbor routers to start the graceful restart procedure; and receiving by the restarted routing protocol processes on the second route processor, information from the neighbor routers regarding the network's topology as part of the graceful restart procedure.

9. The method of claim 8, wherein the routing protocol processes are Open Shortest Path First (OSPF) processes, and the step of sending a message to each of the neighbor routers includes sending an Opaque Link State Advertisement (LSA) to each of the neighbor routers.

10. The method of claim 8, wherein the routing protocol processes are Open Shortest Path First (OSPF) processes, and the step of sending a message to each of the neighbor routers includes sending the message to the neighbor routers before terminating the processes on the first route processor.

11. The method of claim 8, wherein the routing protocol processes are Intermediate System to Intermediate System Protocol (IS-IS) processes, and the step of sending a message to each of the neighbor routers includes sending a message with a Restart Type, Length and Value (TLV) field to each of the neighbor routers indicating that the router is restarting.

12. A method in a first router in an Internet Protocol (IP)-based network for migrating routing protocol processes from a properly functioning first route processor to a second route processor, wherein the first router includes a forwarding engine for forwarding packets to neighbor routers in the network, and wherein the routing protocol processes do not have a defined graceful restart procedure, said method comprising:

terminating the routing protocol processes on the properly functioning first route processor thereby creating a false failure condition;

adding a filter rule to the forwarding engine after terminating the routing protocol processes on the first route processor, the filter rule causing the forwarding engine to divert packets destined for the routing protocol processes on the first route processor to the restarted routing protocol processes on the second route processor in response to the false failure condition;

restarting the routing protocol processes on the second route processor;

receiving periodic refresh messages from each of the neighbor routers regarding a protocol state, said refresh messages including information on all routes within the network's routing domain; and sending a message to each of the neighbor routers advertising that the first router is operational.

13. The method of claim 12, wherein the routing protocol processes are Routing Information Protocol (RIP) processes.

14. A method in a first router in an Internet Protocol (IP)-based network for migrating a Virtual Router (VR) from a properly functioning first route processor to a second route processor, wherein the first router includes a forwarding engine for forwarding packets to neighbor routers in the network, the VR includes routing and signaling protocol processes and a Route Table Manager (RTM) that computes a forwarding information base utilized by the forwarding engine, and the neighbor routers include a graceful restart procedure for maintaining packet flow to the first router and assisting the first router if the first router fails, said method comprising:

terminating the VR's routing and signaling protocol processes on the properly functioning first route processor, thereby stopping the first route processor from responding to messages from the neighbor routers and thereby providing a false indication to the neighbor routers that the first router has failed, and causing the neighbor routers to start the graceful restart procedure in response to the false failure indication;

restarting the VR's routing and signaling protocol processes on the second route processor;

diverting by the forwarding engine, packets destined for the VR's routing and signaling protocol processes on the first route processor to the VR's restarted routing and signaling protocol processes on the second route processor;

receiving by the VR's restarted routing and signaling protocol processes on the second route processor, information from the neighbor routers regarding the network's topology as part of the graceful restart procedure;

restarting the VR's RTM on the second route processor;

receiving by the VR's restarted RTM, information from the VR's restarted routing and signaling protocol processes regarding the network's topology, thereby establishing a routing state;

receiving by the VR's restarted RTM, information from the forwarding engine regarding the current forwarding information base, thereby establishing a forwarding information state; and synchronizing by the RTM, the forwarding information state and the routing state.

15. The method of claim 14, wherein the first route processor and the second route processor are both in the first router.

16. The method of claim 14, wherein the first route processor and the second route processor are in different routers.

17. The method of claim 14, wherein the step of diverting packets by the forwarding engine includes adding a filter rule to the forwarding engine after terminating the VR's routing and signaling protocol processes on the first route processor, the filter rule causing the forwarding engine to divert packets destined for the VR's routing and signaling protocol processes on the first route processor to the VR's restarted routing and signaling protocol processes on the second route processor.

18. The method of claim 14, wherein the step of restarting the routing protocol processes on the second route processor includes setting up peering relationships with the neighbor routers.

19. A first router in an Internet Protocol (IP)-based network in which neighbor routers include a graceful restart procedure for maintaining packet flow to the first router and assisting the first router if the first router fails, said first router comprising:

a forwarding engine for forwarding packets to the neighbor routers in the network;

a properly functioning first route processor connected to the forwarding engine for running routing protocol processes;

a second route processor connected to the forwarding engine for running routing protocol processes; and means for migrating a routing protocol process from the properly functioning first route processor to the second route processor, said migrating means including means for preventing packet loss while migrating the routing protocol process, without requiring changes to the network protocol stack;

wherein the means for preventing packet loss while migrating the routing protocol process includes means for initiating a graceful restart procedure defined for the routing protocol process to maintain packet flow destined for the router while the routing protocol process is migrated, said means for initiating a graceful restart procedure including means for terminating the routing protocol process on the properly functioning first route processor, thereby stopping the first route processor from responding to messages from the neighbor routers and thereby providing a false failure indication to the neighbor routers that the router has failed, and causing the neighbor routers to start the graceful restart procedure in response to the false failure indication;

wherein as part of the graceful restart procedure, the neighbor routers send information about the network's topology to the first router.

20. The router of claim 19, wherein the means for migrating the routing protocol process includes restarting the routing protocol process on the second route processor.

21. The router of claim 20, wherein the means for preventing packet loss while migrating the routing protocol process includes means for adding a filter rule to the forwarding engine, said filter rule causing the forwarding engine to divert packets destined for the routing protocol process on the first route processor to the restarted routing protocol process on the second route processor while migrating the routing protocol process.

* * * * *

UNITED STATES PATENT AND TRADEMARK OFFICE
CERTIFICATE OF CORRECTION

PATENT NO. : 7,583,590 B2
APPLICATION NO. : 11/182967
DATED : September 1, 2009
INVENTOR(S) : Sivakumar et al.

It is certified that error appears in the above-identified patent and that said Letters Patent is hereby corrected as shown below:

In Column 7, Line 34, in Claim 6, delete "selling" and insert -- setting --, therefor.

Signed and Sealed this

Twenty-fourth Day of November, 2009

David J. Kappos
*Director of the United States Patent and Trademark Office*